United States Patent
Mohammed

(10) Patent No.: US 12,203,381 B2
(45) Date of Patent: Jan. 21, 2025

(54) AIRCRAFT ENGINE FLUID SYSTEM WITH BYPASS VALVE

(71) Applicant: PRATT & WHITNEY CANADA CORP., Longueuil (CA)

(72) Inventor: Kashif Mohammed, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/130,643

(22) Filed: Apr. 4, 2023

(65) Prior Publication Data
US 2024/0337200 A1    Oct. 10, 2024

(51) Int. Cl.
*F01D 25/12*    (2006.01)
*F02C 7/14*    (2006.01)
*F03G 7/06*    (2006.01)

(52) U.S. Cl.
CPC ............... *F01D 25/12* (2013.01); *F02C 7/14* (2013.01); *F03G 7/0614* (2021.08); *F05D 2260/20* (2013.01); *F05D 2260/606* (2013.01); *F05D 2300/505* (2013.01)

(58) Field of Classification Search
CPC .......... F01D 25/12; F02C 7/14; F03G 7/0614; F05D 2260/20; F05D 2260/606; F05D 2300/505
See application file for complete search history.

(56) References Cited

U.S. PATENT DOCUMENTS

| | | | |
|---|---|---|---|
| 7,540,431 B2 | 6/2009 | Kozdras et al. | |
| 8,469,083 B2 | 6/2013 | Jainek et al. | |
| 8,708,243 B2 | 4/2014 | Cameron et al. | |
| 9,733,028 B2 | 8/2017 | Scott et al. | |
| 9,771,165 B2* | 9/2017 | Ullyott | F02C 3/10 |
| 2010/0116465 A1* | 5/2010 | Jainek | F28F 27/02 |
| | | | 29/726 |
| 2010/0154427 A1* | 6/2010 | Logan | F16N 7/40 |
| | | | 60/39.08 |
| 2015/0083367 A1* | 3/2015 | Diaz | F02K 3/115 |
| | | | 165/103 |
| 2019/0249602 A1* | 8/2019 | Nayani | F16N 39/02 |

FOREIGN PATENT DOCUMENTS

| | | |
|---|---|---|
| EP | 3273009 | 1/2018 |
| EP | 3763923 | 1/2021 |
| WO | 2015042398 | 3/2015 |

* cited by examiner

*Primary Examiner* — Hoang M Nguyen
(74) *Attorney, Agent, or Firm* — NORTON ROSE FULBRIGHT CANADA LLP

(57) ABSTRACT

An aircraft engine, has: a fluid system including a component adapted for containing a volume of the fluid, the fluid circuit further including a bypass conduit bypassing the component, and a valve fluidly connected to the fluid circuit upstream of the component relative to a flow of the fluid towards the component, the valve having an open configuration fluidly connecting the source of the fluid to the bypass conduit through the valve and a closed configuration in which the valve connects the source of the fluid to the component, the valve movable from the open configuration to the closed configuration in response to the fluid being at a first temperature, and the valve movable from the closed configuration to the open configuration in response to the fluid exerting an opening force on the valve and the fluid being at a second temperature different than the first temperature.

18 Claims, 7 Drawing Sheets

FIG_4

AIRCRAFT ENGINE FLUID SYSTEM WITH BYPASS VALVE

TECHNICAL FIELD

The application relates generally to aircraft engines and to fluid systems of such engines and, more particularly, to systems and methods of operating these components.

BACKGROUND

In a fluid system, such as the one found in an aircraft engine, thermal control valves are used to allow or block flow of fluid in one or more components of the fluid system, such as an air-cooled oil cooler. For example, in the case of the air-cooled oil cooler, it may be desirable to bypass the air-cooled oil cooler when the oil is cold and does not need to be cooled by ambient air. The conventional design for thermal control valves involves a wax motor that contracts or expands according to the temperature. However, wax motors can have leaks (i.e. liquid wax can leak from a housing of the thermal control valve) and render the wax motor unsuitable for its purpose.

Therefore, improvements are needed to improve, among other considerations, reliability of thermal control valves.

SUMMARY

In a first aspect, there is provided an aircraft engine including a fluid system including a fluid circuit fluidly connecting a plurality of components to a fluid source, a component of the plurality of components adapted for containing a volume of the fluid, the fluid circuit further including a bypass conduit bypassing the component, and a valve fluidly connected to the fluid circuit upstream of the component relative to a flow of the fluid towards the component, the valve having an open configuration fluidly connecting the fluid source to the bypass conduit through the valve and a closed configuration in which the valve connects the fluid source to the component, the valve movable from the open configuration to the closed configuration in response to the fluid being at a first temperature, and the valve movable from the closed configuration to the open configuration in response to the fluid exerting an opening force on the valve and the fluid being at a second temperature different than the first temperature.

The aircraft engine may include any of the following features, in any combinations.

In some embodiments, the valve includes a valve member engaged by a deformable member, the deformable member having a first shape and a second shape different than the first shape, the valve being in the open configuration when the deformable member is in the first shape and being in the closed configuration when the deformable member is in the second shape.

In some embodiments, a length of the deformable member varies from the first shape to the second shape.

In some embodiments, the length is greater in the second shape than in the first shape.

In some embodiments, the deformable member biases the valve member against a valve seat in the second shape and maintains a gap between the valve member and the valve seat in the first shape.

In some embodiments, the deformable member includes a shape-memory alloy, the valve being proximate to the component.

In some embodiments, the deformable member is a rod helicoidally wounded about a longitudinal axis and is in-line with the bypass conduit of the fluid circuit, the deformable member in contact with the fluid.

In some embodiments, the opening force required to move the deformable member from the second shape to the first shape is lower than a pressure of the fluid times a surface area of a projection of the valve member on a plane normal to the longitudinal axis.

In some embodiments, a closing force required to move the deformable member from the first shape to the second shape is greater than a pressure of the fluid times a surface area of a projection of the valve member on a plane normal to the longitudinal axis, the closing force being different than the opening force.

In some embodiments, the component is fluidly connected to an inlet and to an outlet, and the deformable member is in contact with the fluid flowing proximate one of the inlet and the outlet.

In some embodiments, the component is part of a heat exchanger.

In another aspect, there is provided a method for permitting a flow of a fluid to a component of a fluid system of an aircraft engine, the method including, when the fluid is at a first temperature, permitting flow of the fluid from a fluid source to a bypass conduit through a valve located upstream of the component relative to a flow of the fluid towards the component, when the fluid is at a second temperature different than the first temperature, blocking fluid communication from the fluid source to the bypass conduit by closing the valve and permitting fluid communication from the fluid source to the component, and upon the fluid reverting to the first temperature and exerting an opening force on the valve, opening the valve and permitting flow of the fluid from the fluid source to the bypass conduit through the valve.

The method described above may include any of the following features, in any combinations.

In some embodiments, the valve includes a valve member engaged by a deformable member, the deformable member having a first shape in which the valve member is distanced from a valve seat and a second shape different than the first shape and in which the valve member is biased against the valve seat, the blocking of the fluid communication from the fluid source to the bypass conduit includes deforming the deformable member with heat of the fluid from the first shape to the second shape.

In some embodiments, the deforming of the deformable member includes varying a length of the deformable member with the heat of the fluid.

In some embodiments, the varying of the length includes increasing the length.

In some embodiments, the deformable member is a rod helicoidally wounded about a longitudinal axis, the rod made of a shape-memory alloy.

In some embodiments, the permitting of the fluid communication from the fluid source to the bypass conduit includes flowing the fluid around the valve member.

In some embodiments, the opening the valve includes deforming the deformable member from the second shape to the first shape by exerting the opening force on the valve, the opening force being lower than a pressure of the fluid times a surface area of a projection of the valve member on a plane normal to a longitudinal axis of the fluid flowing through the bypass conduit.

In some embodiments, the method further includes cold starting the aircraft engine and permitting the flow of the fluid from the fluid source to the bypass conduit.

In some embodiments, the blocking of the fluid communication from the fluid source to the bypass conduit with the valve includes closing the valve when a temperature of the fluid is above a threshold temperature.

DESCRIPTION OF THE DRAWINGS

Reference is now made to the accompanying figures in which:

FIG. 7 is a flowchart illustrating steps of a method for permitting a flow to a component of the oil system of FIG. 2.

DETAILED DESCRIPTION

Figure 1:
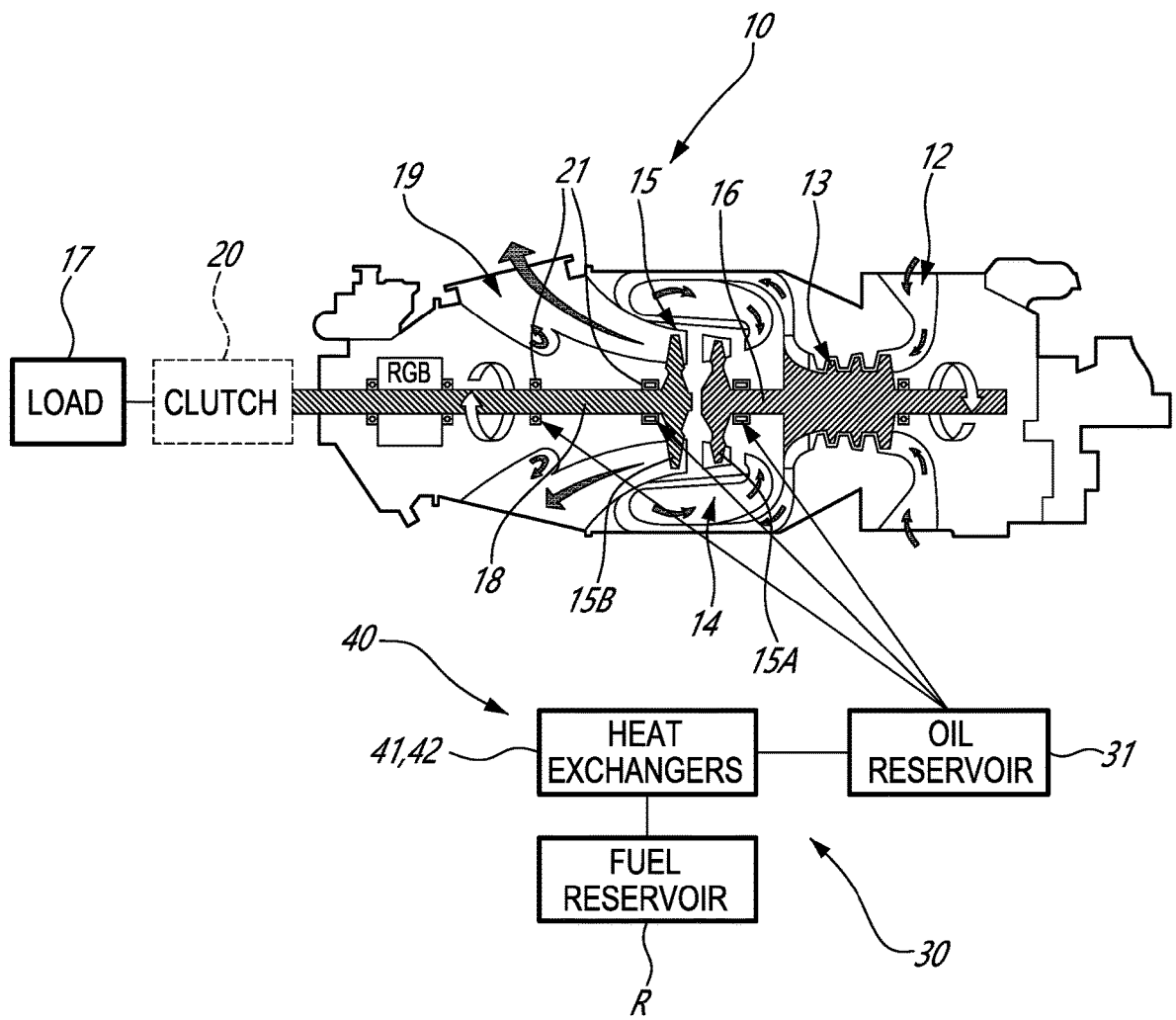
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication an inlet 12 for receiving air, a compressor section 13 for compressing the air received via the inlet 12, a combustor 14 for mixing fuel with the compressed air and for generating an annular stream of combustion gases. A turbine section 15 receiving the combustion gases from the combustor 14. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a load 17, which may be a propeller, a helicopter rotor, and so on, via a low-pressure shaft 18. The low-pressure shaft 18 may be directly engaged to the load or, as shown herein, drivingly engaged to the load 17 via a reduction gearbox RGB. The gas turbine engine 10 has an exhaust 19 for expelling the combustion gases. Although the depicted gas turbine engine 10 is a turboprop or turboshaft engine, the present disclosure may apply to other engines, such as auxiliary power units (APU) and turbofans. In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18. In the embodiment shown, the load 17 is drivingly engaged to the low-pressure shaft 18 via a clutch 20 that has engaged and disengaged configurations to selectively disengage the load 17 from the low-pressure shaft 18. In the case of a turboshaft application, this clutch 20 may allow the disengagement of a helicopter rotor from the low-pressure shaft 18. In some applications, such as a turboprop, the clutch 20 may be omitted.

The low-pressure shaft 18 and the high-pressure shaft 16 are rollingly supported by bearings 21. Typically, the bearings 21 are contained within bearing cavities 22 (FIG. 2) that may be hydraulically connected to an oil source to receive oil for lubrication. An oil system 30 is provided for circulating oil to the bearings 26 and back to an oil source 31 (e.g., oil tank). The oil flowing through the oil system 30 is expected to see its temperature increase during use. It may therefore be required to cool down the oil. This may be done in many ways, for example, by transferring heat to ambient air of an environment outside the gas turbine engine 10 and/or to another fluid, such as the fuel.

In the embodiment shown, the gas turbine engine 10 has a heat exchange system 40 that is used to exchange heat between different fluids for proper operation of the gas turbine engine 10. In the present case, the heat exchange system 40 includes a first heat exchanger 41, which may be referred to as a air-cooled oil cooler (ACOC) used to transfer heat from the oil to the environment outside the gas turbine engine 10. The heat exchange system 40 further includes a second heat exchanger 42, which may be referred to as a fuel-oil heat exchanger (FOHE), used for transferring heat from the oil of the oil system 30 to fuel flowing from a fuel reservoir R, or any other fuel source, to the combustor 14 of the gas turbine engine 10 for combustion. Pre-heating of the fuel as such may increase efficiency of the combustion of the fuel and may cool down the oil that heats up while lubricating the bearings 21. In some cases, the first heat exchanger 41 may be used to transfer or extract heat to/from an aircraft system in need.

Figure 2:
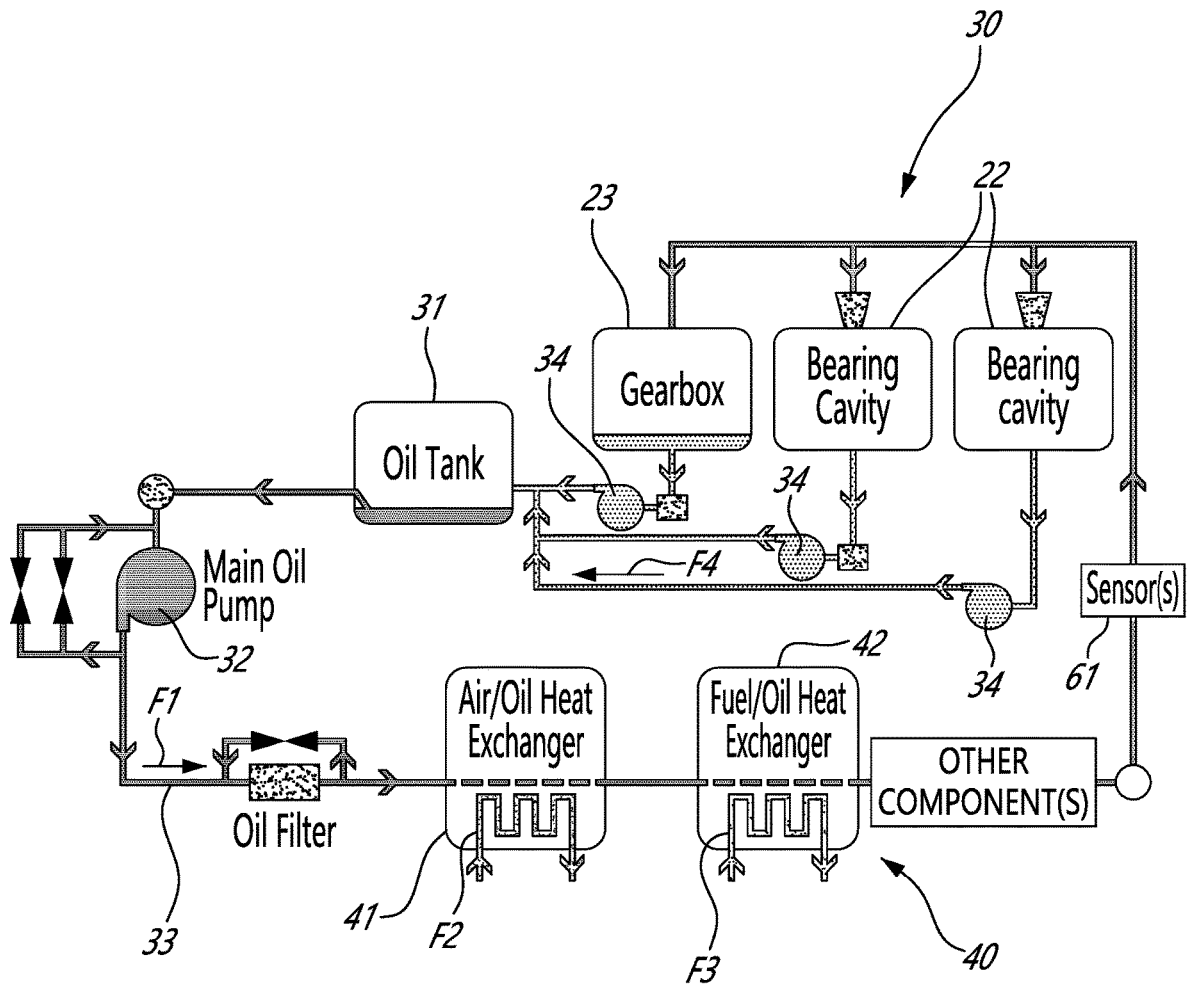
FIG. 2 is a schematic view of a fluid system, depicted as an oil system, for the aircraft engine of FIG. 1.

Referring to FIG. 2, the oil system 30 and the heat exchange system 40 are shown in greater detail. The oil system 30 includes an oil circuit 33, which typically includes one or more lines to flow the oil, an oil pump 32 that drives an oil flow F1 within an oil conduit of the oil circuit 33 from the oil source 31. The oil system 30 may be a pressure regulated system in which a pressure regulating valve may be connected in parallel to the oil pump 32. The oil flow F1 exchanges heat with an airflow F2 from the environment through the first heat exchanger 41 and exchanges heat with a fuel flow F3 through the second heat exchanger 42. The oil flow F1 is then distributed between different components in need of oil. These components may include, for instance, one or more bearing cavity (ies) 22, a generator, an actuator, and/or a gearbox 23, which may correspond to the reduction gearbox of FIG. 1 or any other gearbox of the engine, in some embodiments. Used oil is then scavenged and scavenge pumps 34 drive a scavenge oil flow F4 from scavenge outlets of the bearing cavities 22 and the gearbox 23 back to the oil source 31 where the oil may be flown back to the oil pump 32. Typically, the oil tank has a volume devoid of oil (e.g, empty space containing air). During lubrication, the oil is expected to be mixed with air. Thus, the scavenge oil flow F4 is a multi-phase fluid containing oil and air. The oil may rest some time in the oil tank before being drawn by the pump 32. During this time, the air contained in the oil may naturally separate. A de-oiler and/or de-aerator may be used to accelerate the removal of air from the scavenge oil flow F4. It will be appreciated that many other configurations of the oil system 30 are contemplated. For instance, a different number of scavenge pumps may be used, some components may be omitted, and so on. An actuator may be fluidly connected to the oil conduit and may rely on oil pressure for its operation.

Aircraft engine components, such as the first heat exchanger 41 (i.e., ACOC), the second heat exchanger 42 (i.e., FOHE), and other component(s) may be temperature sensitive. For example, when the aircraft engine 10 is cold started, the oil is cold and has a different viscosity than when the oil is hot. The change in viscosity may impact the functioning of some components of the oil system 30. For example, when the oil is cold, the pressure required to flow the oil through the first heat exchanger 41 is greater than when the oil is hot. In addition, when the oil is cold, there is not necessarily a need for cooling it down. Therefore, it is advantageous to bypass, at least partially, a cooling matrix 41a of the first heat exchanger 41 at least in some conditions.

The present disclosure describes a valve permitting a flow of fluid to a component of the oil system 30 (ex. a cooling matrix 41a of the first heat exchanger 41) as a function of temperature, and more particularly as a function of a temperature of the fluid flowing in the oil system 30 proximate the valve.

Figure 3:
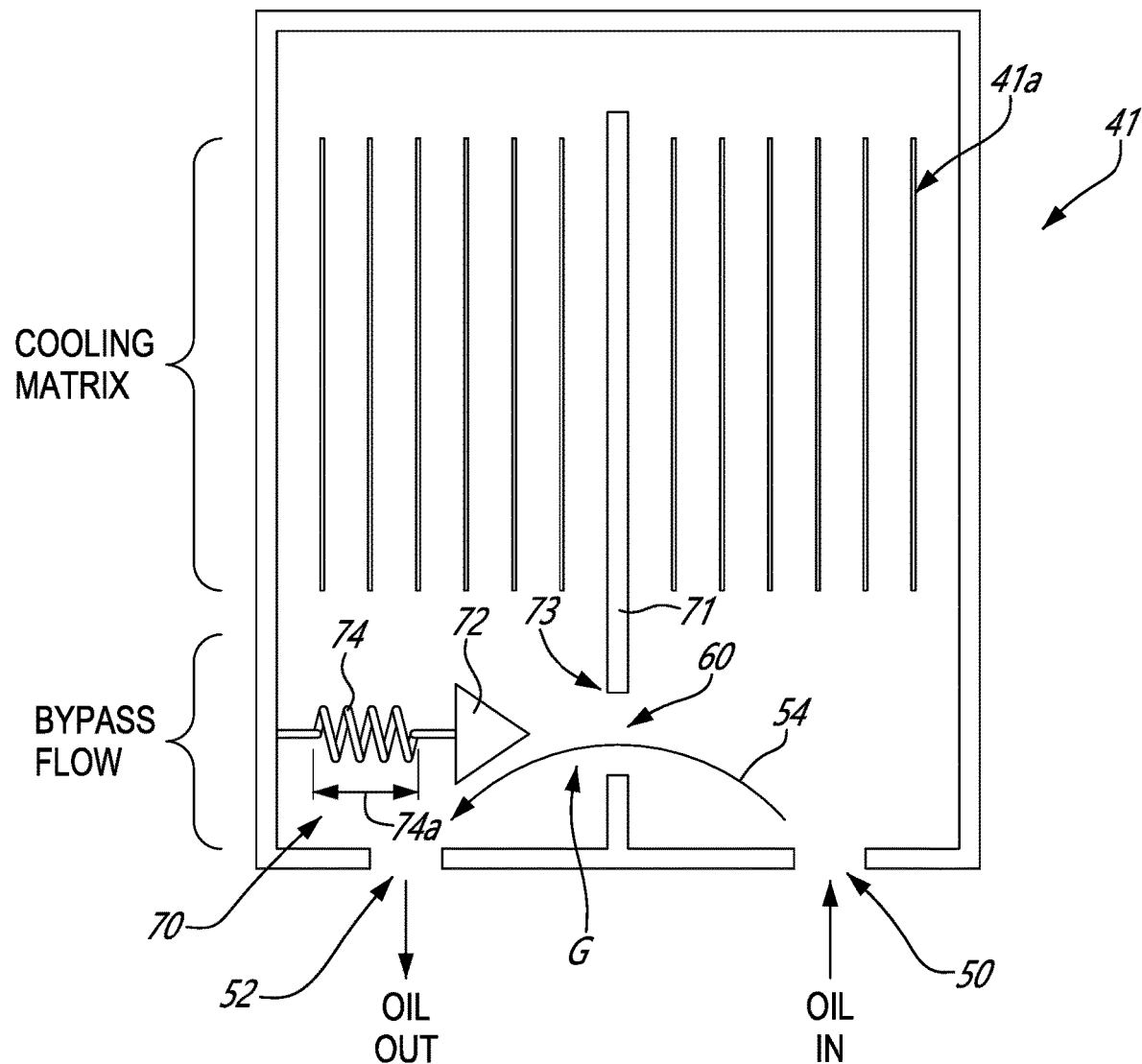
FIG. 3 is an enlarged, schematic view of a portion of the oil system of the aircraft engine of FIG. 1, with a valve in an open configuration and the fluid flowing through a bypass conduit.

Referring now to FIG. 3, an engine component is shown at 41a. The engine component is depicted as the cooling matrix 41a of the first heat exchanger 41. Typically, the engine component 41a is any component containing a baseline volume of oil during normal operation. The engine component 41a may require oil or another fluid for its operation. The first heat exchanger 41 has the cooling matrix 41a in which oil flows and where heat is exchanged between the oil flowing therethrough and ambient air. The first heat exchanger 41 further has an inlet 50 where oil enters the first heat exchanger 41, and an outlet 52 where oil exits the first heat exchanger 41. Throughout the Figs., a direction of the flow of oil is indicated by arrows 54. The first heat exchanger 41 further defines a bypass conduit 60. The bypass conduit 60 permits the flow of oil from the inlet 50 to the outlet 52 without necessarily passing through the cooling matrix 41a. In some embodiments, the bypass conduit 60 is shaped and configured to force at least some oil to flow in the cooling matrix 41a. The bypass conduit 60 is depicted as being a window in a wall 71 of the first heat exchanger 41, but could differ in other embodiments. For example, in another embodiment, the bypass conduit 60 is a line external to the first heat exchanger 41.

In the embodiment shown, the cooling matrix 41a is fluidly connected to the oil source 31 via the oil circuit 33. As shown in FIG. 2, the pump 32 draws oil from the oil source 31 and supplies this oil to the first heat exchanger 41, and on the cooling matrix 41a. A valve 70 is fluidly connected to the oil circuit 33 upstream of and proximate the engine component, i.e. the cooling matrix 41a. For example, a distance between the valve 70 and the cooling matrix 41a of the first heat exchanger 41 may be a few inches.

Figure 4:
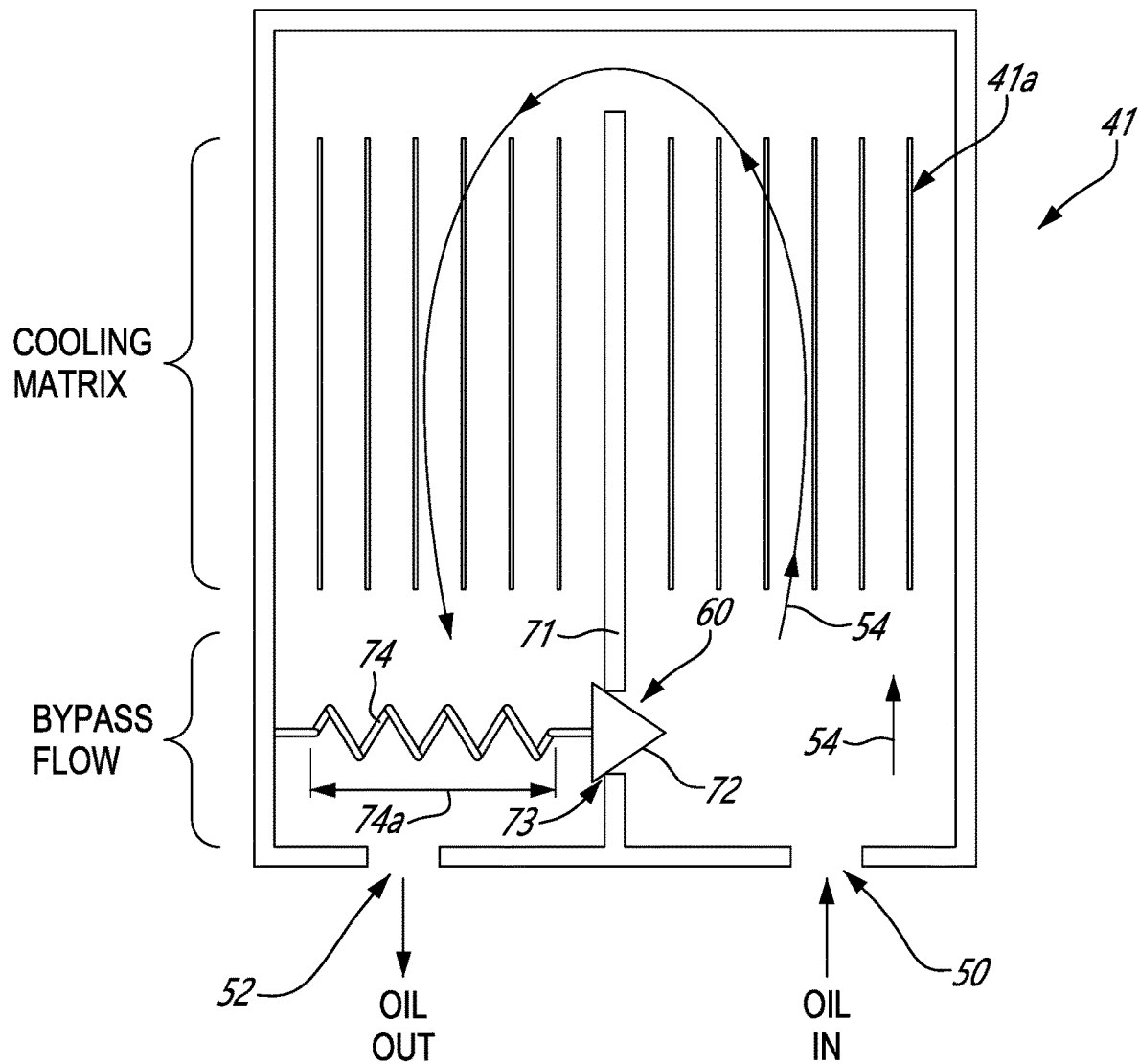
FIG. 4 is an enlarged, schematic view of the portion of the oil system of FIG. 3, with the valve in a closed configuration and the fluid flowing through a component of the oil system.

Referring now to FIGS. 3 and 4, the valve 70 is shown in an open configuration in FIG. 3 and in a closed configuration in FIG. 4. In the open configuration of FIG. 3, the valve 70 fluidly connects the oil source 31 to the bypass conduit 60 through the valve 70. In the closed configuration of FIG. 4, the valve 70 connects the oil source 31 to the engine component 41a. The valve 70 moves from the open configuration to the closed configuration when reaching a threshold temperature.

The valve 70 includes a valve member 72, a valve seat 73 herein defined by the wall 71 of the first heat exchanger 41, and a deformable member 74 engaged to the valve member 72. The deformable member 74 has a first shape depicted in FIG. 3 and a second shape depicted in FIG. 4. The second shape is different than the first shape. The valve 70 is in the open configuration when the deformable member 74 is in the first shape, and is in the closed configuration when the deformable member 74 is in the second shape. In the present embodiment, a length 74a of the deformable member 74 varies from the first shape to the second shape. Herein, the length 74a is greater in the second shape than in the first shape. The deformable member 74 thus biases the valve member 72 against the valve seat 73 in the second shape and maintains a gap G between the valve member 72 and the valve seat 73 in the first shape. Put differently, when in the first shape, the valve member 72 is distanced from the valve seat 73, and when in the second shape, the valve member 72 abuts the valve seat 73.

A default shape of the deformable member 74 may be the second shape depicted in FIG. 4. The deformable member 74 may thus be deformed by compression from the second shape to the first shape of FIG. 3. The deformable member 74 may retain this deformed shape of FIG. 3 until it reaches a temperature above the threshold temperature. At which point, the deformable member 74 would deform back towards its original shape of FIG. 4. The deformable member 74 includes a rod made of a shape-memory alloy. A shape-memory alloy (SMA) is an alloy that may be deformed when cold, but returns to its pre-deformed ("remembered") shape when heated. It may also be called memory metal, memory alloy, smart metal, smart alloy, or muscle wire. The shape-memory alloy may include, for instance, copper-aluminum-nickel, nickel-titanium, zinc-copper-gold-iron, or any other suitable alloys and combinations thereof. The deformable member 74 may be plastically deformed in a compressed state (i.e. the first shape depicted in FIG. 3). Upon being exposed to a temperature above a given threshold temperature, the deformable member 74 will return to its natural expanded state (i.e. the second shaped depicted in FIG. 4) to close the valve 70. The deformable member may have other shapes, such as stacked disk (e.g., Belleville washer), leaf spring, wave spring, etc. Any suitable shapes allowing the deformable member to change length when exposed to a temperature variation is contemplated.

Figure 5:
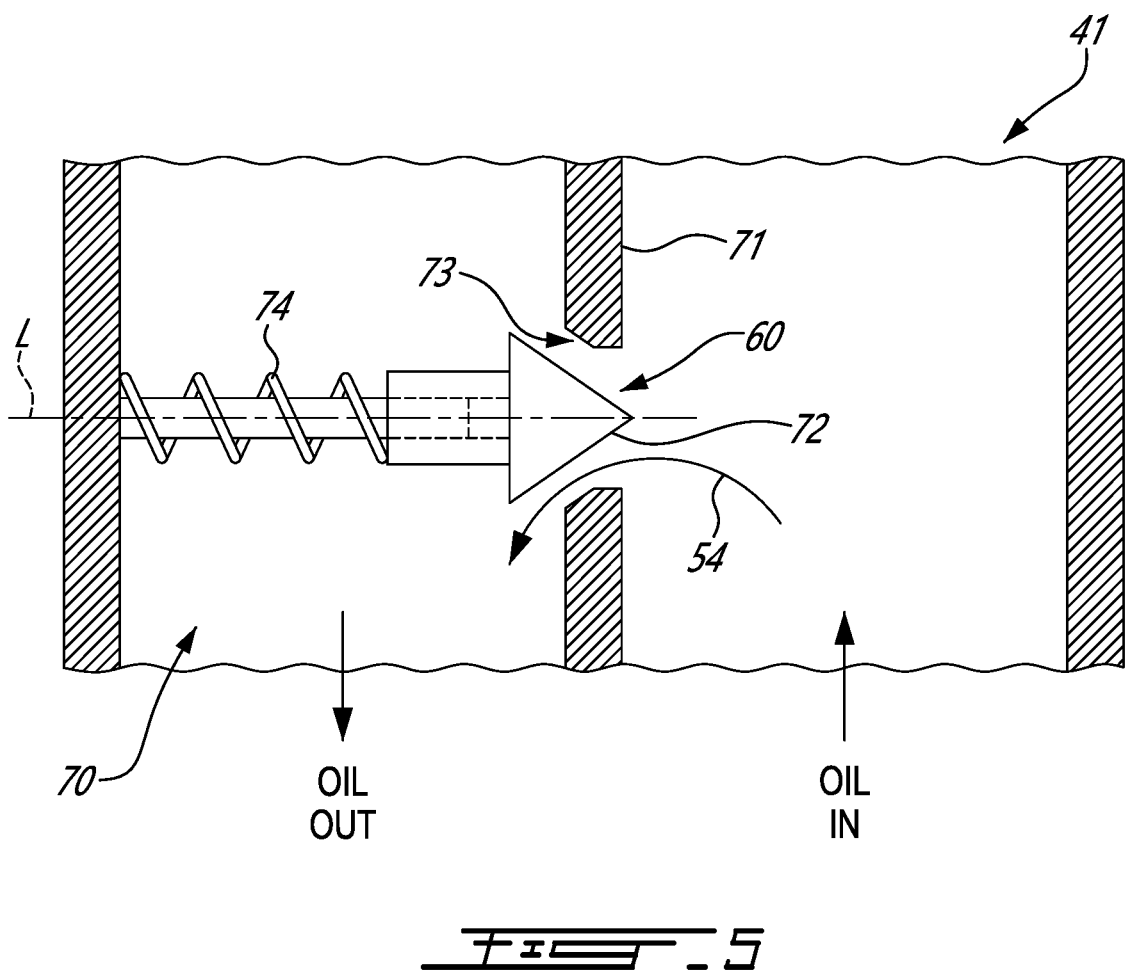
FIG. 5 is a cross-sectional view of the valve of FIG. 3 illustrated in the open configuration.
Figure 6:
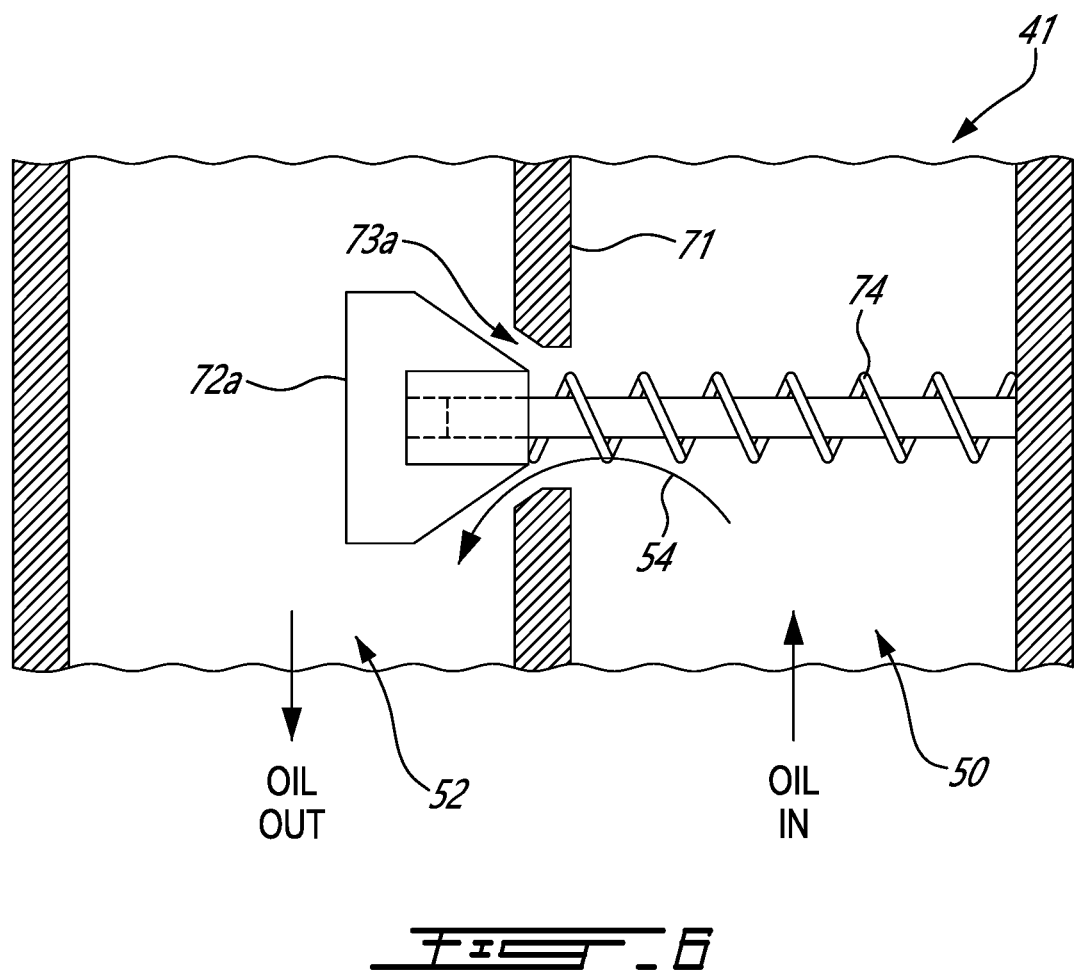
FIG. 6 is a cross-sectional view of another embodiment of the valve of FIG. 3.

In the disclosed embodiment, the deformable member 74 is a rod helicoidally wounded about a longitudinal axis L (FIG. 5), which is in-line with the bypass conduit 60 of the oil circuit 33. By being in-line with the bypass conduit 60 of the oil circuit 33, the deformable member 74 is "wetted" or exposed to the oil. The deformable member 74 may be in contact with the oil. In FIGS. 3, 4 and 5, the deformable member 74 is in contact with the oil proximate the outlet 52 of the first heat exchanger 41. In FIG. 6, the deformable member 74 is in contact with the oil proximate the inlet 50 of the first heat exchanger 41. The valve member 72a in FIG. 6 differs from the valve member 72 depicted in FIGS. 3 to 5 in that the valve member 72a engages a valve seat 73a facing the side of the wall 71 of the first heat exchanger 41 where the outlet 52 is located, while the deformable member 74 is located on the side of the wall 71 of first heat exchanger 41 where the inlet 50 is located. Having the deformable member 74 in contact with the oil may allow the deformable member 74 to react more quickly to an increase or decrease of a temperature of the oil.

The operation of the valve 70 as a function of a temperature of the oil will now be described with reference to FIGS. 3 and 4. When the oil is at a first temperature below the threshold temperature, for example, when the oil is relatively cold, the deformable member 74 is exposed to the oil and is in the first shape. Since the relatively cold oil has an increased viscosity compared to relatively hot oil, and since there is no need to cool down the oil, the valve 70 is in the open configuration and the oil flows from the inlet 50, through the bypass conduit 60 and to the outlet 52 of the first heat exchanger 41. The oil thus avoids passing through the cooling matrix 41a.

As the oil warms up, the oil temperature eventually reaches the threshold temperature. When the deformable member 74 is exposed to the oil at the threshold temperature, the deformable member 74 reverts to its "remembered" shape, i.e. the second shape. When passing from the first shape to the second shape, the deformable member 74 overcomes the force exerted on the valve member 72 by the oil flowing in the direction opposite the direction of expansion of the deformable member 74. A closing force required to move the deformable member 74 from the first shape to the second shape is greater than a pressure of the oil times a surface area of a projection of the valve member 72 on a plane normal to the longitudinal axis L. In other words, the deformable member 74 is sufficiently stiff to avoid the oil pressure from moving the valve member 72 away from the valve seat 73. This may avoid the oil pressure from opening the valve 70 in normal operation when the temperature is above the threshold temperature and may ensure that the deformable member 74 is strong enough to fight the pressure to close the valve 70 when the temperature is above the threshold temperature.

When the valve 70 is in the closed configuration depicted in FIG. 4, the relatively hot oil flows in the cooling matrix 41a and heat is exchanged with ambient air. The oil flowing out of the cooling matrix 41a is at a temperature that remains above the threshold temperature, flows around and past the deformable member 74 and on to the outlet 52 of the first heat exchanger 41. The deformable member 74 remains in the second shape while the oil is at a temperature above the threshold temperature.

When the oil cools down to a temperature below the threshold temperature, for instance after the aircraft engine 10 has been shut down, the deformable member 74 reaches a temperature below the threshold temperature, but may remain in the second shape (i.e. the valve 70 remains in the closed configuration). When the aircraft engine 10 is restarted (i.e. cold start) and the oil flows through the oil circuit 30 and in the first heat exchanger 41 through the inlet 50, the deformable member 74 is compressed back to its first shape by the relatively high viscosity oil as the valve member 72 is subjected to an opening force. The opening force required to move the deformable member 74 from the second shape to the first shape is lower than a pressure of the oil times a surface area of a projection of the valve member 72 on a plane normal to the longitudinal axis L. In other words, the valve 70 is reset to the open configuration by the opening force exerted on the valve 70 by the flowing oil when the oil temperature is below the threshold temperature. This allows the relatively cold and viscous oil to flow in the bypass conduit 60 and avoid the cooling matrix 41a until the oil temperature reaches the threshold temperature.

Referring now to FIG. 7, a method for permitting an oil flow to an engine component is shown at 100. The method 100 below is described using oil as the fluid flowing through the cooling matrix 41a of the first heat exchanger 41 of an oil circuit 30, but may be applicable to other component(s) of the aircraft engine 10.

The method 100 includes, when the fluid is at a first temperature, permitting flow of the oil from the oil source 31 to a bypass conduit 60 through the valve 70 located upstream of the engine component 41a at 102; when the fluid is at a second temperature different than the first temperature, blocking fluid communication from the oil source 31 to the bypass conduit 60 with the valve 70 by closing the valve 70 and permitting fluid communication from the oil source 31 to the engine component 41a at 104; and upon the fluid reverting to the first temperature and exerting an opening force on the valve 70, opening the valve 70 and permitting flow of the oil from oil source 31 to the bypass conduit 60 through the valve 70 at 106.

In the embodiment shown, the blocking of the fluid communication from the oil source 31 to the engine component 41a at 104 includes deforming the deformable member 74 with heat of the oil from the first shape to the second shape. This herein includes varying the length 74a of the deformable member 74 with the heat of the oil. In the present embodiment, the varying of the length 74a includes increasing the length 74a.

Since the valve member 72 is in-line with the bypass conduit 60, the permitting of the fluid communication from the oil source 31 to the bypass conduit 60 at 102 includes flowing the oil around the valve member 72 and around the deformable member 74.

The blocking of the fluid communication with the valve 70 at 104 may include closing the valve 70 when a temperature of the oil is above a threshold temperature. This threshold temperature is selected based on the properties of the deformable member 74.

The opening of the valve 70 at 106 includes deforming the deformable member 74 from the second shape to the first shape by exerting the opening force on the valve 70, the opening force being lower than a pressure of the oil times a surface area of a projection of the valve member 72 on a plane normal to the longitudinal axis of oil flowing through the bypass conduit 60. Put differently, the valve 70 is reset (i.e. moved from the closed configuration to the open configuration) at 106 by the pressure of the oil applied to the valve member 72, and by having the deformable member at a temperature below the threshold temperature.

The present disclosure proposes to use of a valve having a SMA spring (or any other embodiment of a shape/configuration that may be crushed and come back to an original expanded size) that, when above a threshold temperature, has an original size to push the valve in a closed position, then, when below the threshold temperature, the SMA spring is compressed to a smaller size by an opening force exerted by the fluid on a valve member 72 engaged by the SMA spring, whereby the SMA spring allows fluid flow through the valve. Then, when the oil increases in temperature and reaches a temperature above the threshold temperature, the spring reverts back to its original expanded size and thereby pushes the valve member 72 to shutoff the oil flow. The configuration and behaviour of the SMA spring may be selected based on the material properties, fluid viscosity variation, fluid pressure etc. Using such a SMA spring in the construction of the valve may improve reliability of the valve compared to a valve using a wax motor under certain conditions, and offer an alternative to valves having a wax motor.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
a fluid system including a fluid circuit fluidly connecting a plurality of component to a fluid source, the plurality of components including a heat exchanger defining an internal volume having a cooling matrix therein, the heat exchanger having an inlet in fluid communication with the fluid circuit and an outlet in fluid communication with the fluid circuit, and a bypass conduit located within the heat exchanger, the bypass conduit extending between the inlet and the outlet and bypassing the cooling matrix of the heat exchanger, the inlet being on a first side of a wall within the internal volume of the heat exchanger and the outlet being on a second side of the wall opposite the first side of the wall; and
a valve fluidly disposed within the heat exchanger and configured to open or close the bypass conduit, the valve having an open configuration wherein fluid flow through the bypass conduit is permitted to thereby fluidly connect the fluid source to the outlet of the heat exchanger via the bypass conduit without passing through the cooling matrix, and a closed configuration in which the valve blocks the fluid flow through the bypass conduit to thereby fluidly connect the fluid source to the cooling matrix of the heat exchanger, the valve movable from the open configuration to the closed configuration in response to fluid in the fluid circuit being at a first temperature, and the valve movable from the closed configuration to the open configuration in response to the fluid exerting an opening force on the valve and the fluid being at a second temperature different than the first temperature;
wherein the valve includes a valve member engaged by a deformable member, the deformable member having a first shape and a second shape different than the first shape, the valve being in the open configuration when the deformable member is in the first shape and being in the closed configuration when the deformable member is in the second shape; and
wherein the deformable member is disposed on the first side of the wall within the internal volume of the heat exchanger adjacent the inlet, and the valve member is disposed on the second side of the wall within the internal volume of the heat exchanger adjacent the outlet, and wherein the deformable member, when passing from the first shape in the open configuration to the second shape in the closed configuration, contracts in a direction opposite that of a force exerted on the valve member by the fluid flowing through the bypass conduit.

2. The aircraft engine of claim 1, wherein a length of the deformable member varies from the first shape to the second shape.

3. The aircraft engine of claim 2, wherein the length is greater in the second shape than in the first shape.

4. The aircraft engine of claim 1, wherein the deformable member biases the valve member against a valve seat in the second shape and maintains a gap between the valve member and the valve seat in the first shape.

5. The aircraft engine of claim 1, wherein the deformable member includes a shape-memory alloy, the valve being proximate to the component.

6. The aircraft engine of claim 5, wherein the deformable member is a rod helicoidally wounded about a longitudinal axis and is in-line with the bypass conduit of the fluid circuit, the deformable member in contact with the fluid.

7. The aircraft engine of claim 6, wherein the opening force required to move the deformable member from the second shape to the first shape is lower than a pressure of the fluid times a surface area of a projection of the valve member on a plane normal to the longitudinal axis.

8. The aircraft engine of claim 6, wherein a closing force required to move the deformable member from the first shape to the second shape is greater than a pressure of the fluid times a surface area of a projection of the valve member on a plane normal to the longitudinal axis, the closing force being different than the opening force.

9. The aircraft engine of claim 1, wherein the valve member engages a valve seat located on the second side of the wall and facing the outlet.

10. A method for permitting a flow of a fluid to a component of a fluid system of an aircraft engine, the component including a heat exchanger defining an internal volume having a cooling matrix therein, the heat exchanger having an inlet and an outlet the method comprising:
providing a bypass conduit located within the heat exchanger, the bypass conduit extending between the inlet and the outlet and bypassing the cooling matrix of the heat exchanger;
when the fluid is at a first temperature, permitting flow of the fluid from a fluid source to the exit of the heat exchanger via the bypass conduit using a valve located within the bypass conduit of the heat exchanger, the valve including a valve member engaged by a deformable member, the inlet being on a first side of a wall located internally within the heat exchanger and the outlet being on a second side of the wall opposite the first side of the wall, the deformable member disposed on the first side of the wall adjacent the inlet and the valve member disposed on the second side of the wall adjacent the outlet, wherein the deformable member has a first shape in an open configuration of the valve and a second shape in a closed configuration of the valve, and when passing from the first shape in the open configuration to the second shape in the closed configuration, the deformable member is contracted in a direction opposite that of a force exerted on the valve member by the fluid flowing through the bypass conduit;
when the fluid is at a second temperature different than the first temperature, blocking the flow of the fluid through the bypass conduit, to thereby fluidly connect the fluid source to the cooling matrix within the heat exchanger, by closing the valve; and
upon the fluid reverting to the first temperature and exerting an opening force on the valve, opening the valve and permitting flow of the fluid from the fluid source to outlet of the heat exchanger via the bypass conduit within passing through the cooling matrix.

11. The method of claim 10, wherein the blocking of the fluid communication from the fluid source to the bypass conduit includes deforming the deformable member with heat of the fluid from the first shape to the second shape.

12. The method of claim 11, wherein the deforming of the deformable member includes varying a length of the deformable member with the heat of the fluid.

13. The method of claim 12, wherein the varying of the length includes decreasing the length of the deformable member when passing from the open configuration to the closed configuration.

14. The method of claim 11, wherein the deformable member is a rod helicoidally wounded about a longitudinal axis, the rod made of a shape-memory alloy.

15. The method of claim 14, wherein the permitting of the fluid communication from the fluid source to the bypass conduit includes flowing the fluid around the valve member.

16. The method of claim 11, wherein the opening the valve includes deforming the deformable member from the second shape to the first shape by exerting the opening force on the valve, the opening force being lower than a pressure of the fluid times a surface area of a projection of the valve member on a plane normal to a longitudinal axis of the fluid flowing through the bypass conduit.

17. The method of claim 10, comprising cold starting the aircraft engine and permitting the flow of the fluid from the fluid source to the bypass conduit.

18. The method of claim 10, wherein the blocking of the fluid communication from the fluid source to the bypass conduit with the valve includes closing the valve when a temperature of the fluid is above a threshold temperature.

\* \* \* \* \*